United States Patent
Blish et al.

(10) Patent No.: US 6,894,719 B2
(45) Date of Patent: May 17, 2005

(54) METHOD AND APPARATUS FOR CREATING A PRESELECTED LENTICULAR IMAGE

(75) Inventors: Nelson A. Blish, Rochester, NY (US); Sujatha Ramanujan, Pittsford, NY (US); Joshua M. Cobb, Victor, NY (US)

(73) Assignee: Eastman Kodak Company, Rochester, NY (US)

( * ) Notice: Subject to any disclaimer, the term of this patent is extended or adjusted under 35 U.S.C. 154(b) by 713 days.

(21) Appl. No.: 09/935,612

(22) Filed: Aug. 23, 2001

(65) Prior Publication Data

US 2003/0038889 A1 Feb. 27, 2003

(51) Int. Cl.[7] .................. H04N 15/00; H04N 5/225; H04N 9/07; H04N 5/222
(52) U.S. Cl. ............... 348/207.99; 348/59; 348/333.01; 348/267
(58) Field of Search .................. 348/207.99, 311, 348/312, 321, 322, 323, 42–60, 333.01, 333.02, 333.03, 333.04, 333.05, 333.06, 333.07, 333.08, 333.09, 333.1, 333.11, 333.12, 333.13, 218.1, 267

(56) References Cited

U.S. PATENT DOCUMENTS

| | | | |
|---|---|---|---|
| 5,696,371 A | 12/1997 | Meyers | 250/208.1 |
| 5,701,005 A | 12/1997 | Meyers | 250/226 |
| 5,751,492 A | 5/1998 | Meyers | 359/619 |
| 5,867,322 A | 2/1999 | Morton | 359/619 |
| 5,894,326 A | 4/1999 | McIntyre et al. | 348/333 |
| 5,995,132 A | 11/1999 | Tutt | 347/261 |
| 6,137,535 A | 10/2000 | Meyers | 348/340 |
| D438,224 S | 2/2001 | Yanagibashi et al. | D16/202 |
| 6,188,518 B1 * | 2/2001 | Martin | 359/464 |
| 6,278,480 B1 * | 8/2001 | Kurahashi et al. | 348/59 |
| 6,380,970 B1 * | 4/2002 | Minamikawa | 348/46 |
| 6,704,043 B2 * | 3/2004 | Goldstein et al. | 348/45 |
| 6,750,904 B1 * | 6/2004 | Lambert | 348/218.1 |

FOREIGN PATENT DOCUMENTS

GB  2 343 320 A  5/2000

* cited by examiner

*Primary Examiner*—Wendy R. Garber
*Assistant Examiner*—Justin Misleh
(74) *Attorney, Agent, or Firm*—Nelson Adrian Blish; Buskop Law Group, P.C.

(57) ABSTRACT

A preselected lenticular image is created by capturing a first digital image on a plurality of first charged coupled device (CCD) sensor columns (21, 31). A second digital image is created on a plurality of second CCD sensor columns (22, 32). The first and second digital images are stored in an interleaved fashion and previewed on a lenticular screen (112) attached to a camera (10).

21 Claims, 5 Drawing Sheets

METHOD AND APPARATUS FOR CREATING A PRESELECTED LENTICULAR IMAGE

FIELD OF THE INVENTION

The present invention relates to cameras in general and more particularly to an electronic camera which produces a preselected lenticular image.

BACKGROUND OF THE INVENTION

Lenticular overlays give images the appearance of depth or motion. A lenticular image is created using a transparent upper layer having narrow, parallel lenticules or semi-cylindrical lenses on an outer surface, and an image-containing substrate which projects images through the lenticules. The two layers form a lenticular system wherein different portions of an image are selectively visible as a function of the angle from which the system is viewed. If the image is a composite picture made by bringing together into a single image a number of different photographs of a scene photographed from different angles, and the lenticules are vertically oriented, each eye of a view will see different elements and the viewer will interpret the net results as depth of field. The viewer may also move his head with respect to the image thereby observing other views with each eye and enhancing the sense of depth. When the lenticules are oriented horizontally, each eye receives the same image. In this case, the multiple images give illusion of motion when the composite image is rotated about a line parallel to a line formed by the viewers eyes.

Whether the lenticules are oriented vertical or parallel, each of the viewed images are generated by lines of images which have been interlaced at the frequency of the lenticular or line blocking screen. Interlacing lines of each image is referred to as interdigitation. Interdigitation can be better understood by using an example four images used to form a composite with a material having three lenticules. In this example, line 1 from each of the four images is in registration with the first lenticule; line 2 from each of the four images is in registration with the second lenticule; etc. Each lenticule is associated with a plurality of image lines or an image line set, and the viewer sees only one image line of each set with each eye for each lenticule. It is imperative that the line image sets be registered accurately with respect to the lenticules, so that a proper picture is formed when the assembly is viewed.

Lenticular images 60, as shown in FIG. 1, are currently created by selecting several digital photographs, or digitizing photographic prints, and combining the individual photographs. In this example, a composite image comprised of eight photographs is scanned onto recording medium 62 by an eight-sided polygon 70. Facet 71 of polygon 70 lays down scanline 81 relating to a first original image. Facet 72 lays down scanline 82 from a second original image. This process is repeated with each facet laying down one line from each of the eight individual images until medium 60 has been advanced the width of one lenticule 64. The process is repeated with facet 71 laying down a second line from the first image as scanline 91, facet 72 laying down a second line of a second original image as scanline 92, and so forth for facets 73–78, until the media 62 has been advanced the width of another lenticule 64. Thus, each original image is laid down by only one facet of polygon 70.

Using this method, or other similar methods, the photographs have already been taken and individual photographs selected and digitized to prepare a lenticular image. One such system is shown in U.S. Pat. No. 5,995,132. This is a retrospective process and is highly sensitive to laying down each line of each image, interlaced, in exact registration with each lenticule. Consumers who choose to have a lenticular image prepared may not know until the lenticular image is actually produced whether the results will be satisfactory. Since the lenticular print will not be ready until a period of time after the event has taken place, if the final results are unsatisfactory, the opportunity to retake the lenticular image will have passed.

There is a need for a prospective process, which will be more consumer friendly, increase the use of lenticular images, and result in lenticular prints which capture the depth images or motion images that the photographer intended.

SUMMARY OF THE INVENTION

In one embodiment of the invention, a consumer selects a lenticular image mode on a digital camera. The digital camera electronically arranges a charged couple device (CCD) sensor array into groups of three columns each. A first photograph is imaged on a first column of each group, a second photograph is imaged on a second column of each group, and a third photograph is imaged on a third column of each group. A complete, interleaved lenticular image is stored on a memory card.

An advantage of the present invention is that consumers will be able to select in advance which photographs are going to be lenticular, so that the digital images are preselected and preformatted when they are processed. An additional advantage of the present invention is that consumers will be able to preview preselected lenticular images when their camera is equipped with a lenticular liquid crystal display (LCD) screen. Preselected lenticular images will result in an increase in print orders for lenticular images and an increase in sales of digital cameras having this feature.

The above objects, advantages, and novel features of the present invention will become more apparent from the accompanying detailed description thereof when considered in conjunction with the follow drawings.

DETAILED DESCRIPTION OF THE INVENTION

The present invention will be directed in particular to elements forming part of, or in cooperation more directly with, the apparatus in accordance with the present invention. It is to be understood that elements not specifically shown or described may take various forms well know to those skilled in the art.

Figure 1:
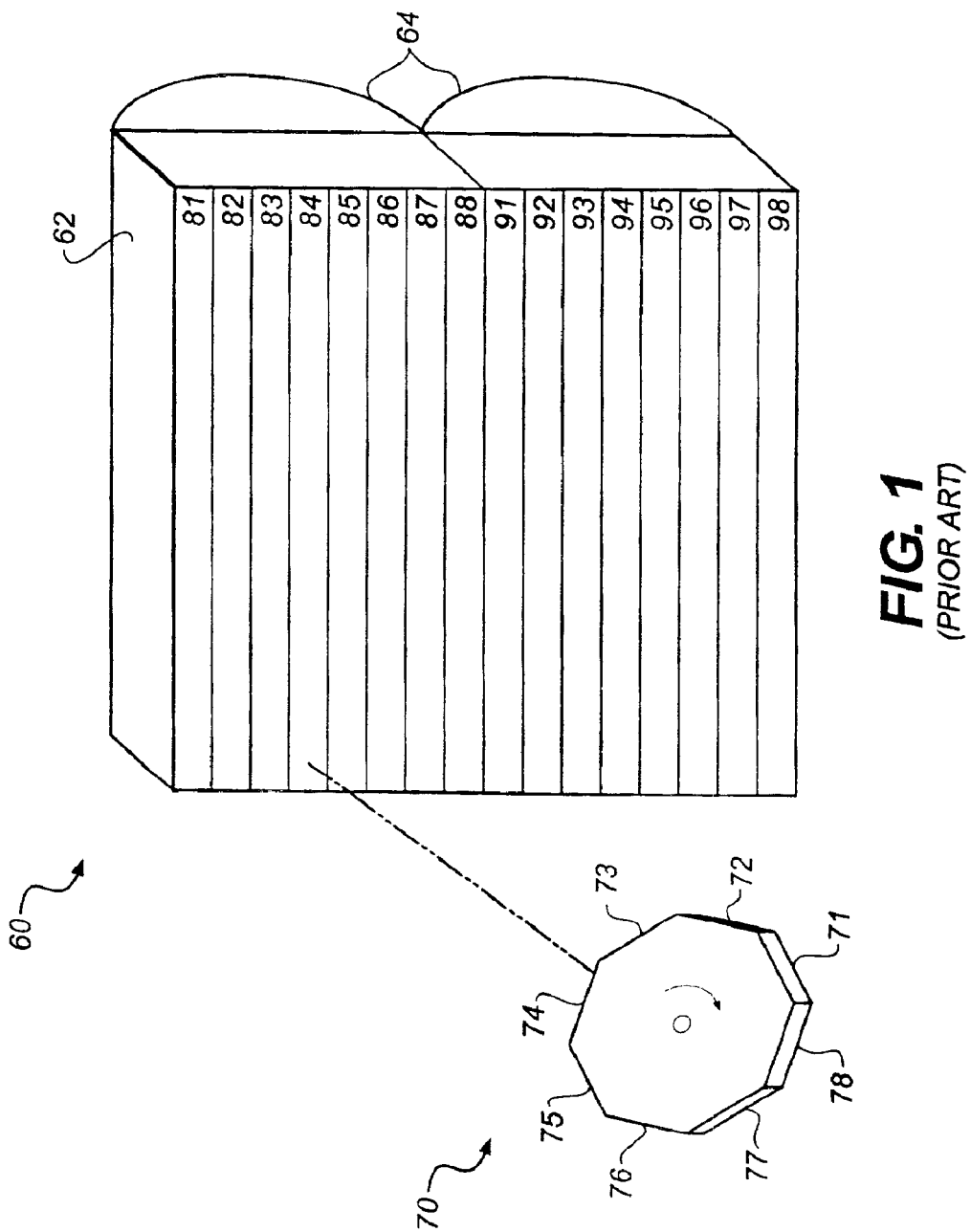
FIG. 1 is a schematic perspective view of a prior art polygon printer for printing interdigitated images from eight separate original images.
Figure 2:
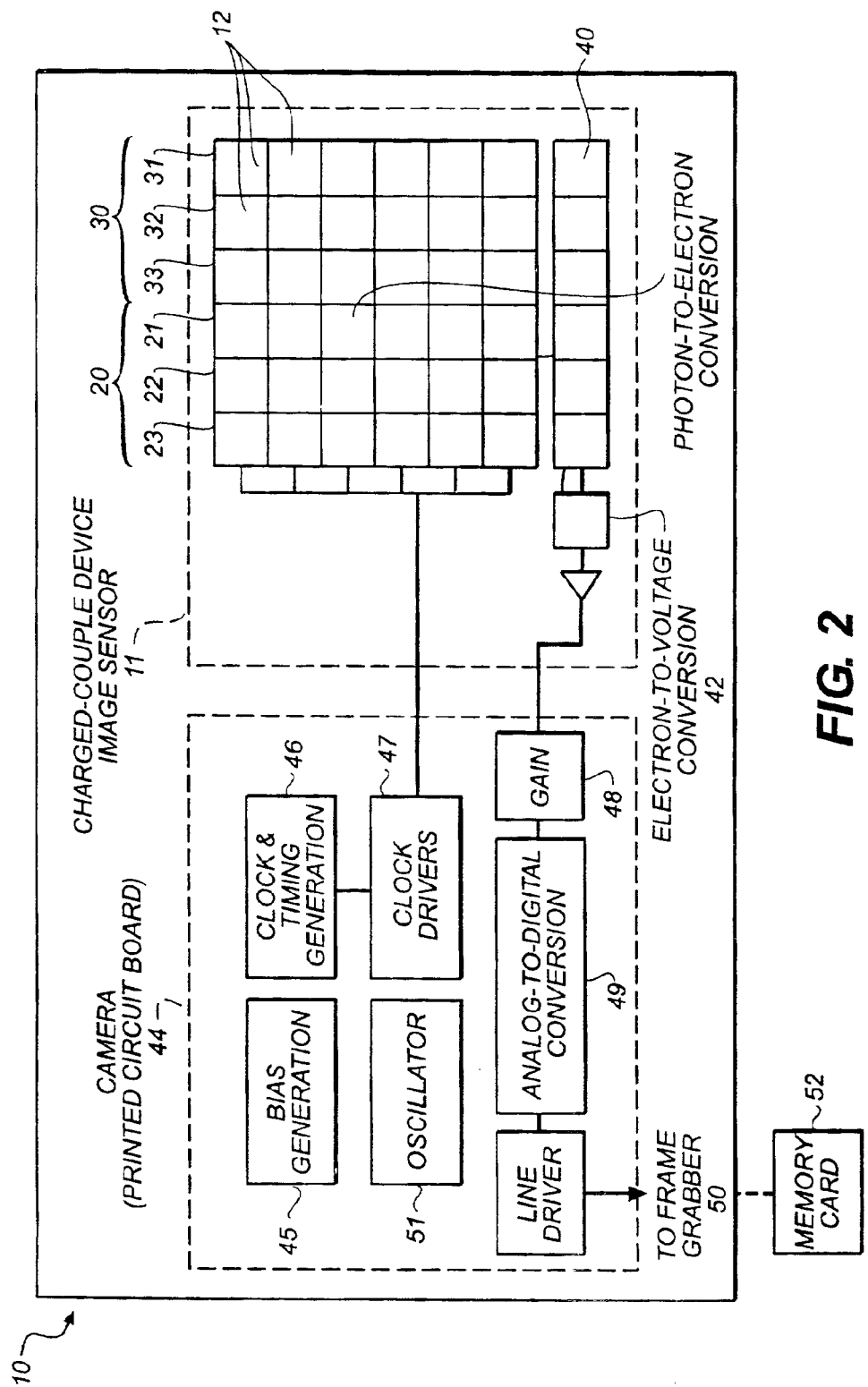
FIG. 2 is a block diagram of the electronic components of a digital camera incorporating a charged coupled device (CCD) according to the present invention.

Referring now to FIG. 2, a block diagram shows the electrical components of a digital camera 10 according to the present invention. A charged couple device (CCD) 11 is comprised of sensors 12 which are pixilated metal oxide semiconductors. Sensors 12 accumulate signal charge in each pixel proportional to the local illumination intensity, serving a spatial sampling function.

Figure 4:
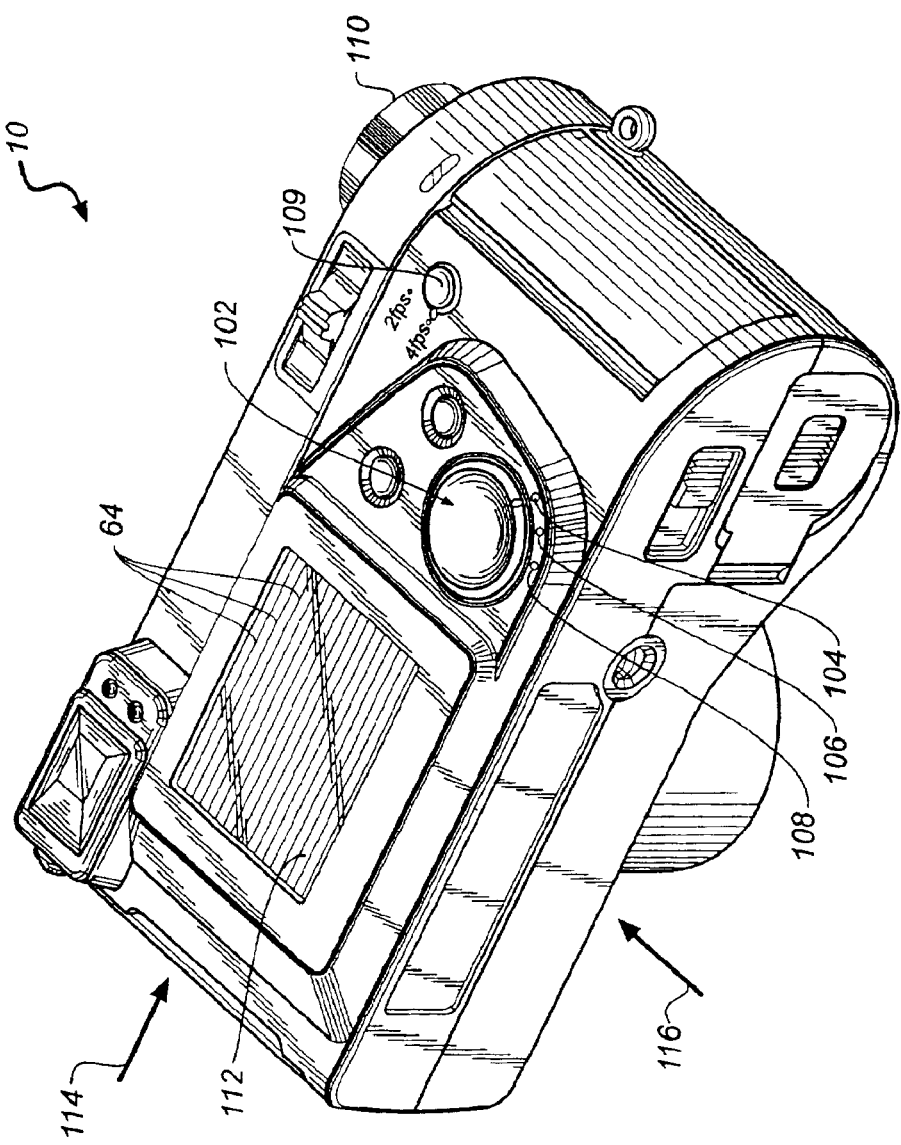
FIG. 4 is a perspective view of a digital camera according to the present invention.

In the embodiment shown, simplified for the purpose of illustration, the CCD 11 is electronically divided into a first group 20 and a second group 30. Each of the groups are further subdivided into columns 21, 22, 23, and 31, 32, 33. When a mode selector 102 on the digital camera, shown in FIG. 4, is used to select a lenticular image, the first photograph taken will only be recorded on a first column of each group. Thus, in the embodiment shown, the first image will be recorded on columns 21 and 31.

When an exposure is complete, each individual image sensor in the first column 21, converts photons to electrons. Each pixel's charge packet is sequentially transferred to a common output structure 40 and the electrons are converted to a voltage 42. In a similar fashion the first image will be recorded on the first column 31 of group 30 and the charge transferred.

A second image taken by digital camera 10 will be captured on a second column 22 of first group 20 and a second column 32 of second group 30. A third image is captured in a similar fashion on the third columns 23 of first group 20, and third column 33 second group 30. The three images are stored in an interleaved digital file on a memory card 52 ready for printing to the image side of a lenticular recording medium.

A printed circuit board 44 associated with the CCD 11 typically contains bias generation 45, clock and timing generation 46, clock drivers 47, gain 48, analog to digital conversion 49, frame grabber 50, and oscillator 51 for proper operation of the charged coupled device 11. These components and their functions are well known in the art.

Figure 3:
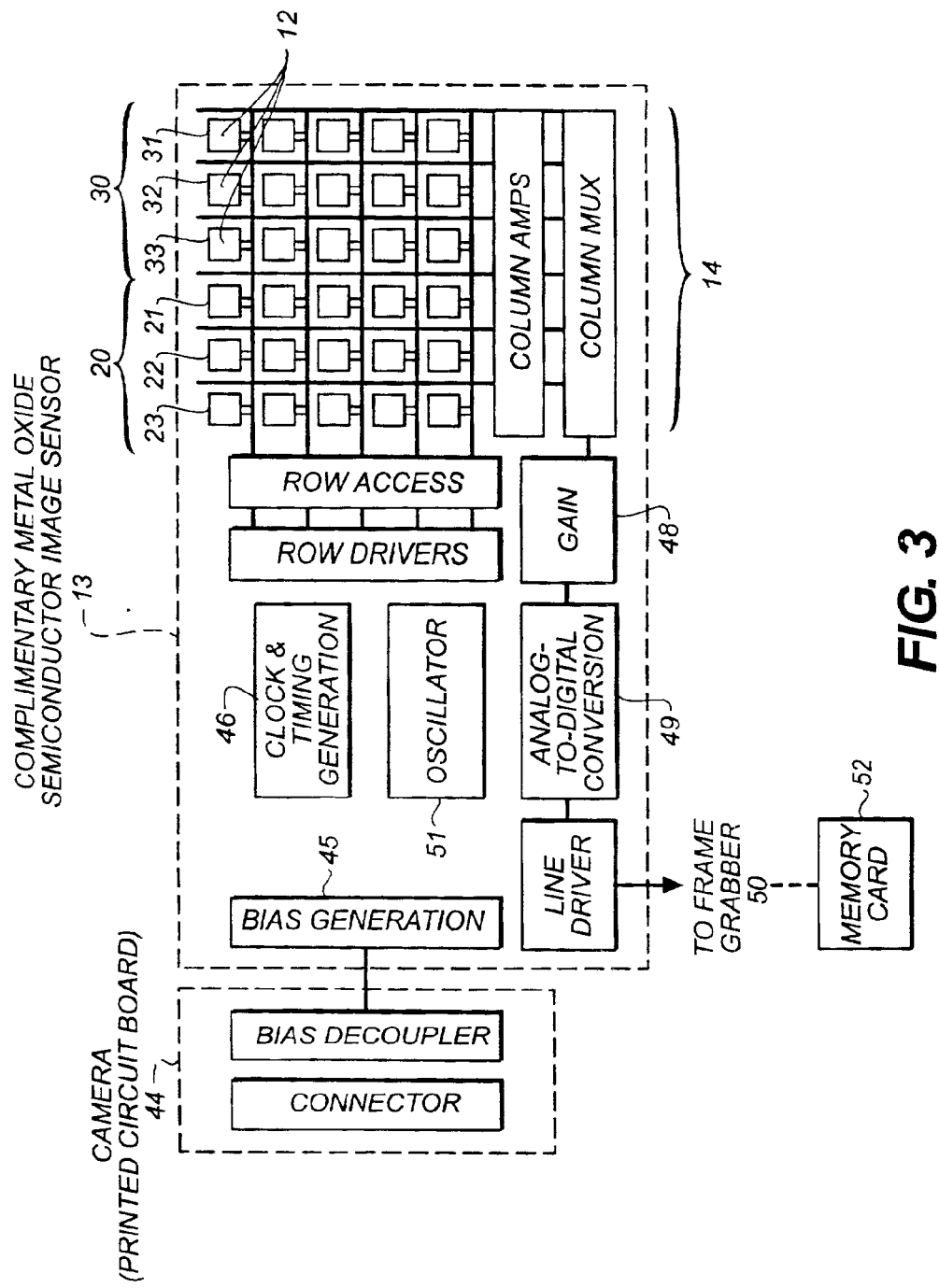
FIG. 3 is a block diagram of the electronic components of a digital camera incorporating a complementary metal oxide semiconductor (CMOS) image sensor according to the present invention.

In a digital camera incorporating a complimentary metal oxide semiconductor (CMOS) imager 13, shown in FIG. 3, the charge-to-voltage conversion takes place in each pixel 12. There is a difference in readout techniques for a CMOS imager, which has significant implications for sensor architecture, capabilities and limitations. Overall operation of a digital camera using a CMOS imager, however, will be similar to the embodiment described in detail above. The sensors 12 of the CMOS imager 13 are divided into a first group 20 and a second group 30 each of which is comprised of individual columns for the purpose of taking interleaved images for a preselected lenticular image as described above.

FIG. 4 shows a perspective view of a digital camera 10 according to the present invention. A mode selector 102 has a 3D lenticular image position 104 that is used by the operator for configuring the camera to capture a preselected 3D lenticular image which will give the appearance of depth. When a 3D preselected lenticular image is selected on the mode selector 102 the camera functions as described above. A standard position 108 on mode selector 102 is used to take a standard, single frame digital images.

Figure 5:
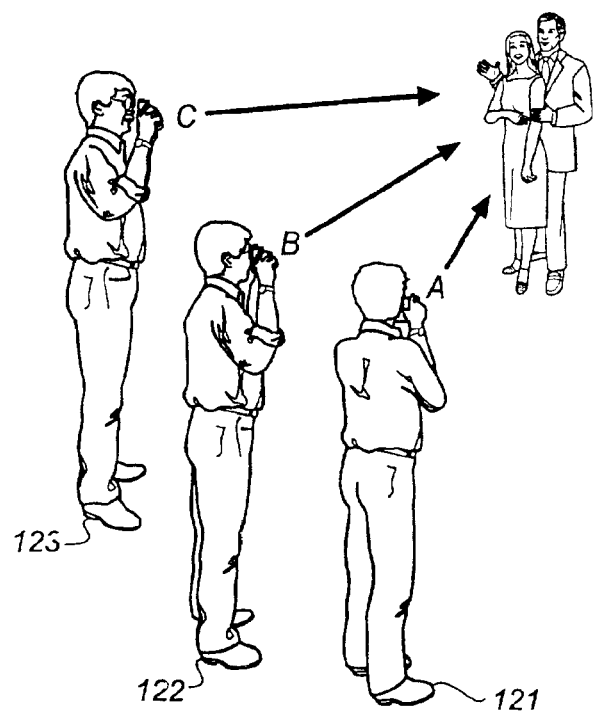
FIG. 5 is a perspective view of a photographer taking a three dimensional (3D) preselected lenticular image according to the present invention.

To capture a 3D preselected lenticular image the camera operator takes a first photograph at a first position 121, as shown in FIG. 5. A second photograph is taken at a second position 122, and a third photograph at a third position 123. The images are interleaved electronically to form a preselected lenticular image.

Figure 6:
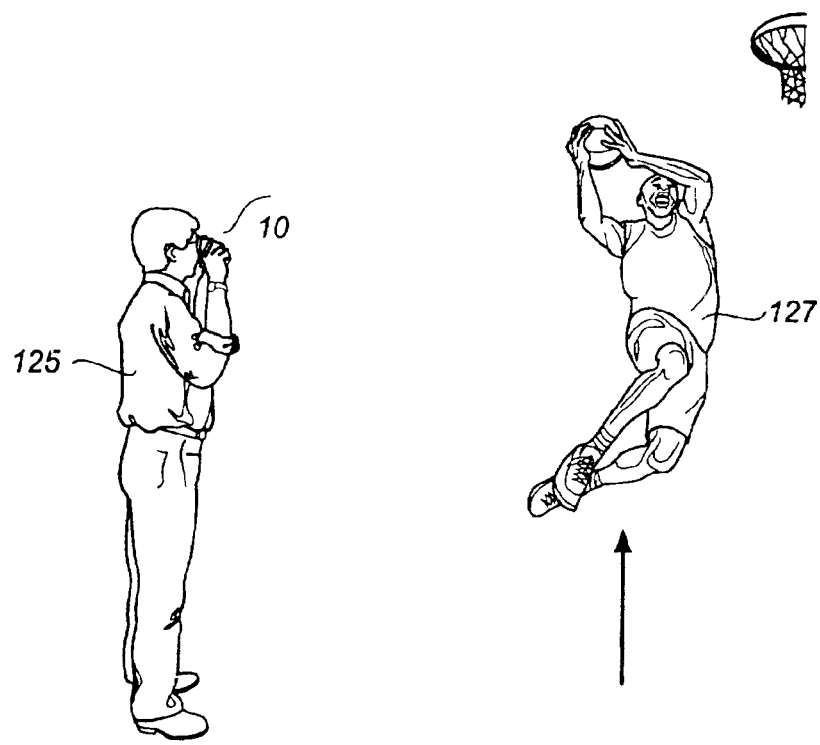
FIG. 6 is a perspective view of a photographer taking an action preselected lenticular image according to the present invention.

Referring to FIGS. 4 and 6, to take an action preselected lenticular image the camera operator 125 selects the appropriate action setting 106 on the mode selector 102 and depresses the camera shutter 110. The digital camera captures a series of images in a rapid fashion as the subject 127 moves. For example, some digital cameras today capture digital images in a burst mode at two frames per second (FPS). The images are processed electronically as described above and stored in an interleaved fashion.

In a further embodiment of the present invention burst mode switch 109 is set at a burst mode speed required by the action to be captured. For example, some sports events may require a higher burst mode speed, i.e., a batter swinging a bat in baseball. For other sports a slower speed may be appropriate, for example, a bowler making an approach shot prior to ball release. In the example shown the burst mode switch 109 has two settings, two frames per second and four frames per second, but a variety of other burst mode speeds may be appropriate.

In another embodiment of the invention a liquid crystal device (LCD) screen 112 on the back of the digital camera 10 contains a lenticular surface. See FIG. 4. This allows viewing of the preselected lenticular image by the operator immediately after completing the series of photos used for the preselected lenticular image. In the example given above wherein a 3D image is created, the preselected lenticular image is presented to the viewer with lenticules 64 oriented vertically. The photographer views the preselected lenticular image from the angle 114, which is accomplished by turning the digital camera so that the LCD screen 112 is oriented vertically.

When an action preselected lenticular image is created the preselected lenticular image is displayed so that the lenticules are oriented horizontally with respect to the viewer from angle 116. To view the action preselected lenticular image the viewer would orient the camera so that the lenticules 64 are parallel to the viewers eyes. The camera is tilted up and down to provide motion for the action preselected lenticular image.

It will be understood that the embodiments shown are simplified for purposes of illustration. A typical CCD or CMOS sensor 14 for use in the present invention should be at least three mega-pixels in capacity to produce preselected lenticular images. This will produce sub-images of at least one mega-pixel each, lower resolution images, however, may be acceptable in some applications.

In the embodiments described the preselected lenticular image are comprised of only three separate sub-images corresponding to the three columns in each group. The CCD or CMOS sensors, however, can be subdivided electronically into groups having a plurality of columns, which correspond to the number of images desired in the preselected lenticular image. The higher the number of images included in the preselected lenticular image, however, the lower the resolution of each image. In a similar fashion, although only two groups are shown in the example, the sensor array would be divided into numerous groups corresponding to the number of lenticules in the preselected lenticular image.

In the embodiments shown, an LCD screen has been used to view preselected lenticular images. It will be understood, however, that other viewing screens, for example, an Organic Light Emitting Diode (OLED), will be acceptable.

The invention has been described in detail with particular reference to certain preferred embodiments thereof, but it will be understood that variations and modifications can be effected within the scope of the invention.

Parts List

10. Digital camera
11. Charged Coupled Device (CCD)
12. CCD sensors
13. CMOS imager
14. CMOS sensors
20. First group
21. Columns 1
22. Columns 2
23. Columns 3
30. Second group
31. Column 1
32. Column 2
33. Column 3
40. Output structure
42 Electron-to-voltage
44. Circuit board
45. Bias generation
46. Clock and timing generation
47. Clock drivers
48. Gain
49. Digital conversion
50. Frame grabber
51. Oscillator
52. Memory card
60. Lenticular images
62. Recording medium
64. Lenticules
70. Eight-sided polygon
71. Facet
72. Facet
73–78. Facets
81–88. Scanline
91–98. Scanline
102. Mode selector
104. 3D position
106. Action position
108. Standard position
109. Burst mode switch
110. Camera shutter
112. LCD screen
116. Angle
121. First position
122. Second position
123. Third position
125. Camera operator
127. Subject

What is claimed is:

1. A method for creating a preselected lenticular image using a charged coupled device, comprising the steps of:
    creating a first digital image on a plurality of first charged coupled device sensor columns in the charged coupled device at a first position;
    moving the charged couple device to a second position after creating the first digital image;
    creating a second digital image on a plurality of second charged coupled sensor columns in the charged coupled device at a second position after moving the charged coupled device to the second position; and
    storing said first and second digital images in an alternating interleaved fashion forming an interleaved image.

2. A method as in claim 1 wherein each of said first charged coupled device sensor columns is adjacent to each of said second charged coupled device sensor columns.

3. A method as in claim 1 comprising the additional steps of:
    moving the charged coupled device to a third position after creating the second digital image and creating a third digital image on a plurality of third charged coupled device sensor columns in the charged coupled device.

4. A method as in claim 3 wherein each of said first charged coupled device sensor columns is adjacent to each of said second charged coupled device sensor columns and wherein each of said third charged coupled device sensor columns is adjacent to each of said second charged coupled device sensor columns.

5. A method as in claim 1 comprising the additional step of:
    previewing a preselected lenticular image after forming said interleaved image.

6. A method as in claim 5 wherein said interleaved image is transferred to a lenticular screen for previewing the preselected lenticular image and the lenticular screen is mounted on a digital camera.

7. A method as in claim 6 wherein said lenticular screen is a lenticular liquid crystal device (LCD).

8. A method as in claim 7 comprising the additional step of:
    orienting lenticules on said lenticular liquid crystal device vertically with respect to a viewer for previewing three dimensional (3D) preselected lenticular images.

9. A method as in claim 7 comprising the additional step of:
    orienting lenticules on said lenticular liquid crystal device parallel with respect to a viewer for previewing action preselected lenticular images.

10. A method as in claim 1 wherein said preselected lenticular image is a three dimensional (3D) image.

11. A method as in claim 1 wherein said preselected lenticular image is an action image.

12. A method for creating a preselected lenticular image using a complementary metal oxide semiconductor device comprising the steps of:
    creating a first digital image on a plurality of first complementary metal oxide semiconductor sensor columns in the complementary metal oxide semiconductor device at a first position;
    moving the complementary metal oxide semiconductor to a second position after creating the first digital image;
    creating a second digital image on a plurality of second complementary metal oxide semiconductor sensor columns in the complementary metal oxide semiconductor device at the second position after moving the complementary metal oxide semiconductor device to the second position; and
    storing said first and second digital images in an alternating interleaved fashion forming an interleaved image.

13. A method as in claim 12 wherein each of said first complementary metal oxide semiconductor device sensor columns is adjacent to each of said second complementary metal oxide semiconductor device sensor columns.

14. A method as in claim 12 comprising the additional steps of:
    moving the complementary metal oxide semiconductor device to a third position after creating the second digital image and creating a third digital image on a plurality of third complementary metal oxide semiconductor device sensor columns in the complementary metal oxide semiconductor device.

15. A method as in claim 14 wherein each of said first complementary metal oxide semiconductor device sensor columns is adjacent to each of said second complementary metal oxide semiconductor device sensor columns and wherein each of said third complementary metal oxide semiconductor device sensor columns is adjacent to each of said second complementary metal oxide semiconductor device sensor columns.

16. A method as in claim 12 comprising the additional step of:

previewing a preselected lenticular image after forming said interleaved image.

17. A method as in claim 16 wherein a lenticular screen, wherein said lenticular screen is a lenticular liquid crystal device (LCD) mounted on a digital camera.

18. A method as in claim 17 comprising the additional step of:

orienting lenticules on said lenticular liquid crystal device vertically with respect to a viewer for viewing three dimensional (3D) preselected lenticular images.

19. A method as in claim 17 comprising the additional step of:

orienting lenticules on said lenticular liquid crystal device parallel with respect to a viewer's eyes for previewing action preselected lenticular images.

20. A method as in claim 12 wherein said preselected lenticular image is a three dimensional (3D) image.

21. A method as in claim 12 wherein said preselected lenticular image is an action image.

* * * * *